United States Patent
Wang et al.

[11] Patent Number: 5,913,028
[45] Date of Patent: Jun. 15, 1999

[54] CLIENT/SERVER DATA TRAFFIC DELIVERY SYSTEM AND METHOD

[75] Inventors: Frank Wang; Jeffrey S. Robertson; Nuggehalli N. Gopal, all of Boca Raton; Charles J. Pheterson, Davie; Michael S. Goldflam, Parkland, all of Fla.

[73] Assignee: Xpoint Technologies, Inc., Boca Raton, Fla.

[21] Appl. No.: 08/540,589

[22] Filed: Oct. 6, 1995

[51] Int. Cl.[6] .................................................. G06F 13/00
[52] U.S. Cl. .............................. 395/200.33; 395/200.49; 395/200.62; 395/200.47; 395/200.42
[58] Field of Search ........................... 395/200.3, 200.31, 395/200.33, 200.47, 200.48, 200.49, 200.53, 200.57, 200.62, 200.68, 200.75, 200.42, 853, 851; 361/803

[56] References Cited

U.S. PATENT DOCUMENTS

| | | |
|---|---|---|
| 4,246,637 | 1/1981 | Brown et al. . |
| 4,475,155 | 10/1984 | Oishi et al. . |
| 4,503,497 | 3/1985 | Krygowski et al. . |
| 4,682,304 | 7/1987 | Tierney . |
| 4,688,166 | 8/1987 | Schneider . |
| 5,131,081 | 7/1992 | MacKenna et al. . |
| 5,369,749 | 11/1994 | Baker et al. . |
| 5,375,218 | 12/1994 | Umeda . |
| 5,404,481 | 4/1995 | Miyamori . |
| 5,412,782 | 5/1995 | Hausman et al. . |
| 5,420,988 | 5/1995 | Elliott . |
| 5,426,737 | 6/1995 | Jacobs . |
| 5,442,749 | 8/1995 | Northcatt et al. ................... 395/200.49 |
| 5,515,510 | 5/1996 | Kikinis ............................... 395/200.33 |
| 5,539,621 | 7/1996 | Kikinis ..................................... 361/803 |

*Primary Examiner*—Tod R. Swann
*Assistant Examiner*—J. Peikari
*Attorney, Agent, or Firm*—Malin, Haley, DiMaggio & Crosby, P.A.

[57] ABSTRACT

A direct data delivery system and method for use in client/server environments for direct transfer of data files between Peer I/O Devices so as to allow reading from or writing to file servers with minimal burden to the file server's central processing units, to alleviate congestion on data buses and delay of real time data delivery. The instant invention provides high bandwidth server solutions based upon hardware and software components that enable direct data/file transfers among peer I/O devices, including but not limited to, directed data transfers between storage and network I/O devices.

29 Claims, 9 Drawing Sheets

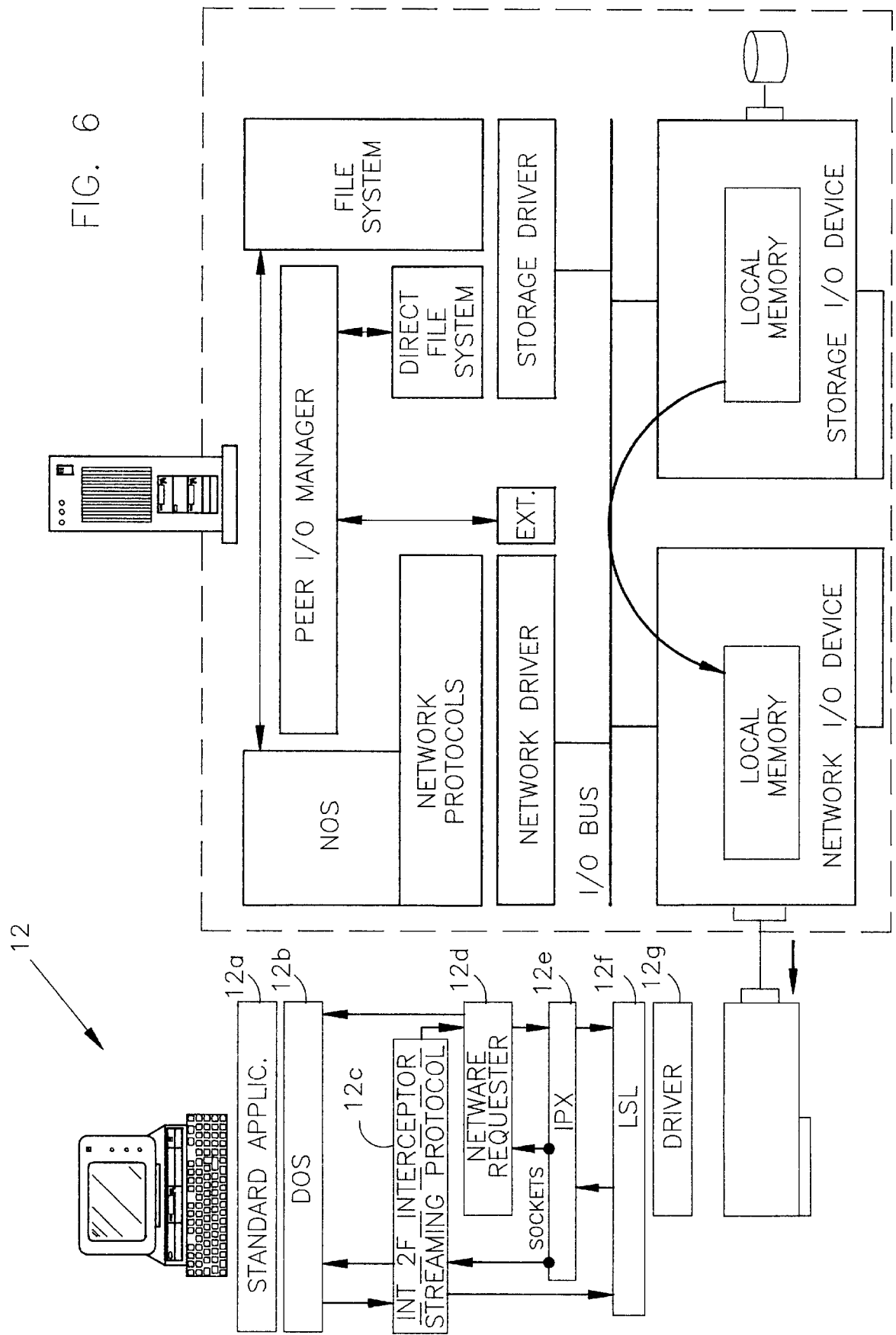

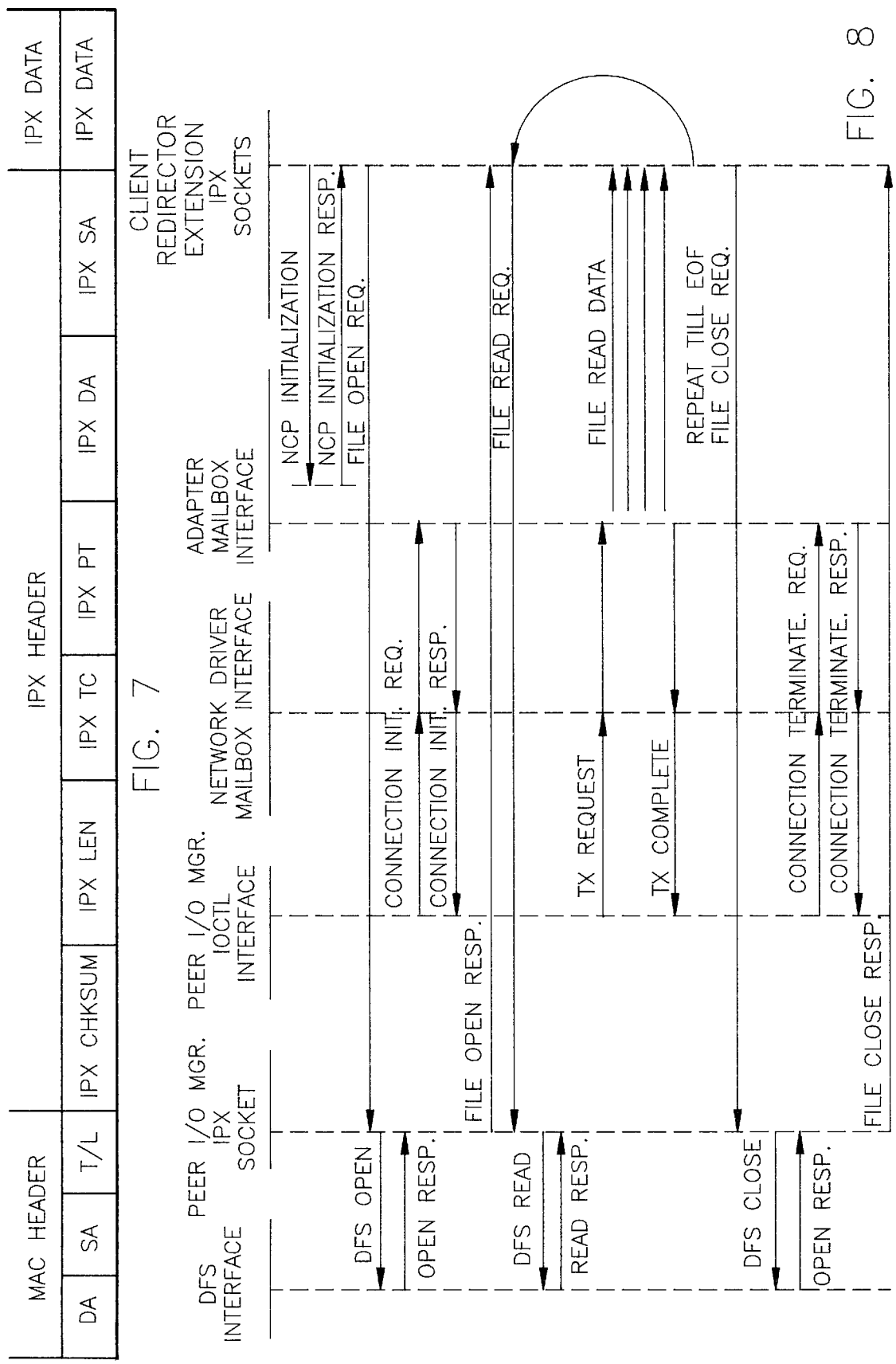

CLIENT/SERVER DATA TRAFFIC DELIVERY SYSTEM AND METHOD

BACKGROUND OF THE INVENTION

1. Field of the Invention

This invention relates generally to a data traffic managing system and method for improved data delivery in client/server systems, and in particular, the instant invention provides high bandwidth server solutions based upon hardware and software components that enable direct data/file transfers among peer I/O devices, including but not limited to, directed data transfers between storage and network I/O devices.

2. Description of the Background Art

Background client/server data/file retrieval and delivery systems and techniques are relatively time consuming, especially for large data files and programs, and result in data traffic congestion, especially in local area networks (LANs) serving many client end users. Server system congestion degrades overall LAN performance and limits the number of jobs that the CPU may otherwise be performing. For instance, it has been estimated that client/server systems are available only a fraction of the time and take almost three seconds to respond to users as a result of data congestion and CPU overload. Accordingly, more reliable and faster client/server systems are desirable.

Server systems could be more reliable and have quicker response times if system internal congestion was reduced. System congestion is generally a result of the path through which data and files are directed when accessing the server main memory, the number of client end users communicating with the server in a LAN and the speed of response by the server. LAN systems generally comprise closed computer systems including a number of client end users, typically in the form of personal computers attached to a common network, which access a predetermined number of data files and/or programs via the control of a central server unit. The background server generally comprises at least one central processing unit (CPU) which initiates and sets up the I/O hardware for data retrieval and transmission. The server CPU receives and processes the commands and data from network and storage I/O devices and temporarily stores the data in its own memory locations as it prepares protocol headers before transmitting the selected data files back to the network I/O device and clients. These background data retrieval and transmission techniques are time-consuming and cause the data traffic congestion which slows up the server network, especially in a LAN serving many client users. Congestion is created because the CPU must use its own processing hardware and cache memory for set up, temporary data storage and transmission thereby clogging the server with additional traffic and high volume messages. The server system congests and degrades the overall LAN performance and limits the number of jobs that a CPU may otherwise be performing. Congestion and system degradation will prove to be an increasingly annoying problem as simpler systems take on larger tasks, more users and increasingly demanding loads. Without implementing improved process data processing techniques, the speed enhancements offered by today's software and hardware packages will not be fully realized by LAN client users.

Referring to FIG. 1, the architecture of a background file server 1 generally comprises a planar board, also referred to as a "mother board", and a plurality of I/O devices. The basic hardware components of the server are normally located directly on the planar board, or are electrically connected by the planar board. These basic hardware components typically include, one or more Central Processing Units (CPUs) 5, dynamic memory 4 used for temporary storage of program files and data, and I/O bus expansion slots, used to install expansion I/O devices, such as storage and network communication devices. The I/O devices include, but are not limited to, network I/O devices 2, storage I/O devices 3, and display I/O devices. I/O Devices, such as those mentioned, are typically distinguished by characteristics, such as, intelligent or non-intelligent and bus master or slave device. Intelligent devices have an on-board CPU and are capable of offloading functions that are typically performed by the planar-board CPU. Non-intelligent devices do not have on-board CPUS. Bus Master devices have DMA access to Planar-board Memory and are able to move data from I/O Device Memory to Planar-board Memory.

The traditional server architecture is based upon a planar-board with attached I/O devices. The attached I/O devices read and write data into planar-board memory under program control of the planar-board CPUs 5 as shown in FIG. 1. FIG. 1 also illustrates the basic flow of data (1A and 1B) from one I/O device to another I/O Device. Data being moved from Device B3 to Device A2 flows through planar-board memory under the control of the planar-board CPU 5. This architecture moves data from one I/O Device to another by transferring it two times across the I/O bus, once from the source I/O Device to planar-board memory 4 and from the planar-board memory 4 to the destination I/O device. Planar-board CPU 5 intervention is required to control both I/O operations, as well as all processing performed to the data in between the two I/O operations.

Consequently, there exists a need for improving the efficiency and response time of LAN systems via improved data delivery techniques so as to reduce congestion and system degradation so that the server systems can keep pace with today's improving mainframes and personal computers. The instant invention addresses these needs by increasing server efficiency eliminating the planar board memory from the transmission path.

SUMMARY OF THE INVENTION

In light of the shortcomings noted in current client/server systems as noted above, it is an object of the present invention to address these problems by providing a data delivery system and technique for improving client/server data transmission to optimize the speed and efficiency of client/server system response time and throughput. It is also an object of the instant invention to expedite the delivery of large data files in client/server systems.

It is a further object of the instant invention to streamline data delivery and bypass the planar board memory, for relieving cache congestion and preserving cache memory for other applications.

It is still an object of the instant invention to prevent data traffic congestion on the server buses and delay of real time data delivery.

It is another object of the instant invention to reduce server CPU utilization by taking advantage of data processing power provided by intelligent network I/O device.

It is an additional object of the invention to reduce system reliance on planar board CPU(s) for data delivery so as to relieve the CPU for other tasks.

It is yet another object of the instant invention to reduce server system bus utilization by transferring bulk data files directly between storage I/O devices, or disk storage, and LAN I/O adapters.

It is yet an additional object of the instant invention to deliver data files directly between client end users and the file servers storage I/O device by eliminating the planar board memory CPU from the data transmission path.

It is yet a further object of the instant invention to reduce LAN utilization and delivery time by providing an efficient application layer streaming protocol.

It is still another object of the instant invention to provide faster response to file I/O requests made to the server through more efficient delivery of data to applications within the client by eliminating unnecessary data copies to the server planar board memory.

It is still an additional object of the instant invention to reduce CPU utilization in clients by eliminating unnecessary data copies such as those made to the server main memory.

It is still a further object of the instant invention to provide support for all security, authentication and data protection services in current network systems.

It is still another object of the instant invention to incorporate the instant invention with traditional data delivery services provided by current and future operating systems, such as NetWare ™(trademark of Novell, Inc.), DOS applications, OS/2 (trademark of IBM), Windows 3.1x, and Windows '95 (trademark of Microsoft), and other operating systems.

Still another object of the instant invention is to provide a data delivery system and technique which is compatible with pre-existing client/server systems, such as 10BaseT, 10Base2 and other networks.

The foregoing objects are accomplished by the instant invention which comprises a high bandwidth server including integration of hardware and software components that enable direct data transfers among peer I/O devices, including but not restricted to, direct data transfers between data storage I/O devices and network I/O devices. The input/output devices are option devices which are installed into industry standard expansion slots in processing units, such as the server system discussed herein. These I/O devices provide a means for computers to input data for processing and to output the processed data to either client end-users or storage disks/mediums. The instant invention provides a server system including novel hardware and software components which read from and write to predetermined storage devices for manipulating and accessing data with minimal burden to the server's CPU(s) or causing data congestion on the buses. This is generally accomplished by eliminating the planar board memory and directly delivering data between the storage I/O and network I/O. Accordingly, the instant invention utilizes peer I/O devices to interoperate directly through bus master/slave data transfers so as to alleviate data traffic congestion and optimizes data delivery.

The instant invention generally comprises an intelligent network I/O device capable of peer I/O, a bus master storage I/O device, software extensions to the network I/O device driver, and a software component referred to herein as Peer I/O Manager. The intelligent network I/O device provides buffering for raw data accepted from the storage I/O device through peer I/O data transfers. This network device also provides sufficient processing power to perform network protocol processing of the raw data and distribution of the processed data to clients interfaced with the network. A plurality of network I/O devices may simultaneously be controlled by the Peer I/O Manager. The storage I/O device provides a permanent storage for program and data files used by the planer board CPU and client end users attached to the network. A plurality of storage I/O devices may simultaneously be controlled by Peer I/O Manager. The Peer I/O Manager implementation provides the program control necessary for coordinating and initiating peer I/O transfers directly from the storage I/O device to the network I/O device. The Peer I/O Manager software is capable of simultaneously controlling the plurality of storage and network I/O devices. Network I/O device driver extensions provide message passing interface between software components on the network I/O device and the Peer I/O Manager software. In addition to the software and hardware residing in the file server, the Peer I/O Manager also interacts with software extensions residing in the network attached client end users. Accordingly, there is additional software referred to herein as client redirector extension, which is a communication peer to the Peer I/O Manager. The purpose of the client redirector extension is to differentiate and expedite requests to be processed by a the Peer I/O Manager in the file server.

The above-mentioned components to interoperate through the following basic software interfaces:

An efficient network protocol that permits high performance data transfers between the intelligent Network I/O Device and Network Attached Clients. This protocol software resides in the Peer I/O Manager in the file server and on Network Attached Clients.

An interface to permit control messages to be passed from the intelligent Network I/O Device to the Network I/O Device driver that executes on the Planar-board CPU.

An interface to permit data to be passed from the intelligent Network I/O Device to the Network I/O Device driver that executes on the Planar-board CPU.

An interface to permit control messages to be passed from the Network I/O Device driver to the Peer I/O Manager software component.

An interface to permit control messages to be passed from the Peer I/O Manager software component to the Direct File system.

With reference to the preferred purpose of the instant invention, that is the direct transfer of data files between the storage I/O device and the network I/O device, the instant invention comprises a plurality of steps which are followed to effectuate the objects of the instant invention. It should be noted that the following flow of steps discussed hereto refer to reading files from a storage I/O device, but that it also illustrates the basic flow of data required for writing to a file albeit in somewhat a reversed order. Thus, in light of these steps regarding the flow of data from the file server, these steps may be modified for file writing purposes without departing from the scope and spirit of the instant invention. First, a file read request is received by the network I/O device and passed to the storage I/O device driver by way of the network I/O device driver of the Network Layer Protocol (IPX) and the Peer I/O Manager. The Peer I/O Manager passes the request to the storage I/O driver via the direct file system. The storage I/O device reads data into its local memory and then moves the data directly into buffers on the network I/O device. Once the data has been moved into the network data buffers, the storage I/O device posts a completion of the transfer to the storage I/O device driver, which in turn posts a completion to the direct file system. The direct file system then posts the data transfer completion notice to the Peer I/O Manager which informs the network I/O device that data has been buffered locally into an identifiable memory location and is ready for transmission. The network I/O device creates network data packets from the locally buffered data. The network I/O device then transfers the data package from local memory to the client end user's attached network. Successful completion of the data transfer is acknowledged by the network I/O device by posting a completion status to the Peer I/O Manager. The Peer I/O Manager then reclaims the data buffers previously used and associated with the transfer for subsequent use.

In accordance with these and other objects which will become apparent hereinafter, the instant invention will now be described with particular reference to the accompanying drawings.

BRIEF DESCRIPTION OF THE DRAWINGS

FIG. 6 is a system block diagram of the client/server system of the instant invention illustrating the software layers present on the client end user attached to the network and the software layers of the server system.

FIG. 7 is a table illustration of the fields comprising data packet transmitted between a network client and a file server.

FIG. 8 is a flow diagram of the instant invention illustrating the basic flow of command and file information through the various interface stages comprising the peer I/O solution and making up the Peer I/O Manager and client redirector extension software of the instant invention.

DESCRIPTION OF THE PREFERRED EMBODIMENTS

Figure 2:
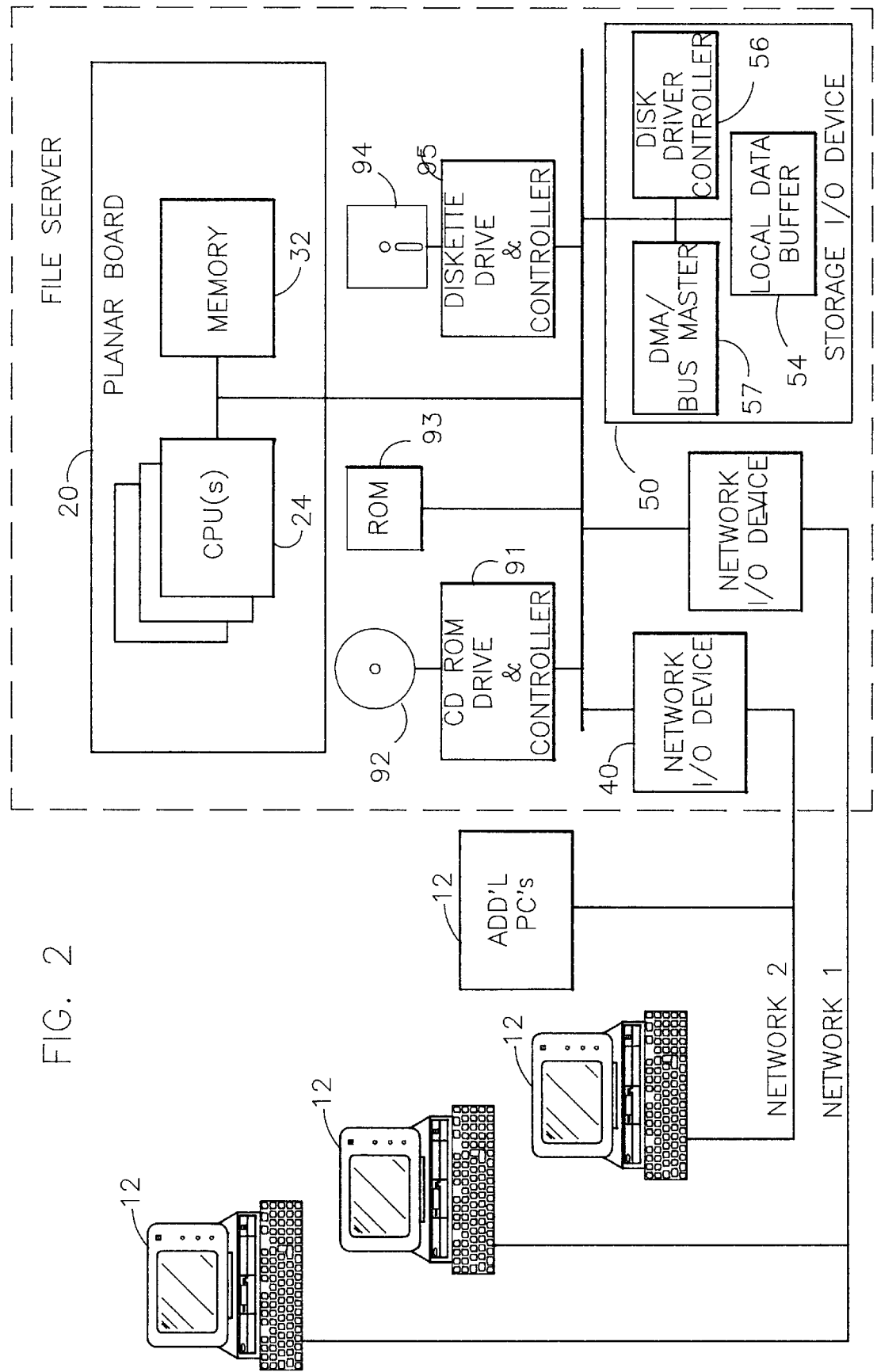
FIG. 2 is a block diagram of the file server of the instant invention illustrating the general flow of data from storage I/O device to the network I/O device.
Figure 3:
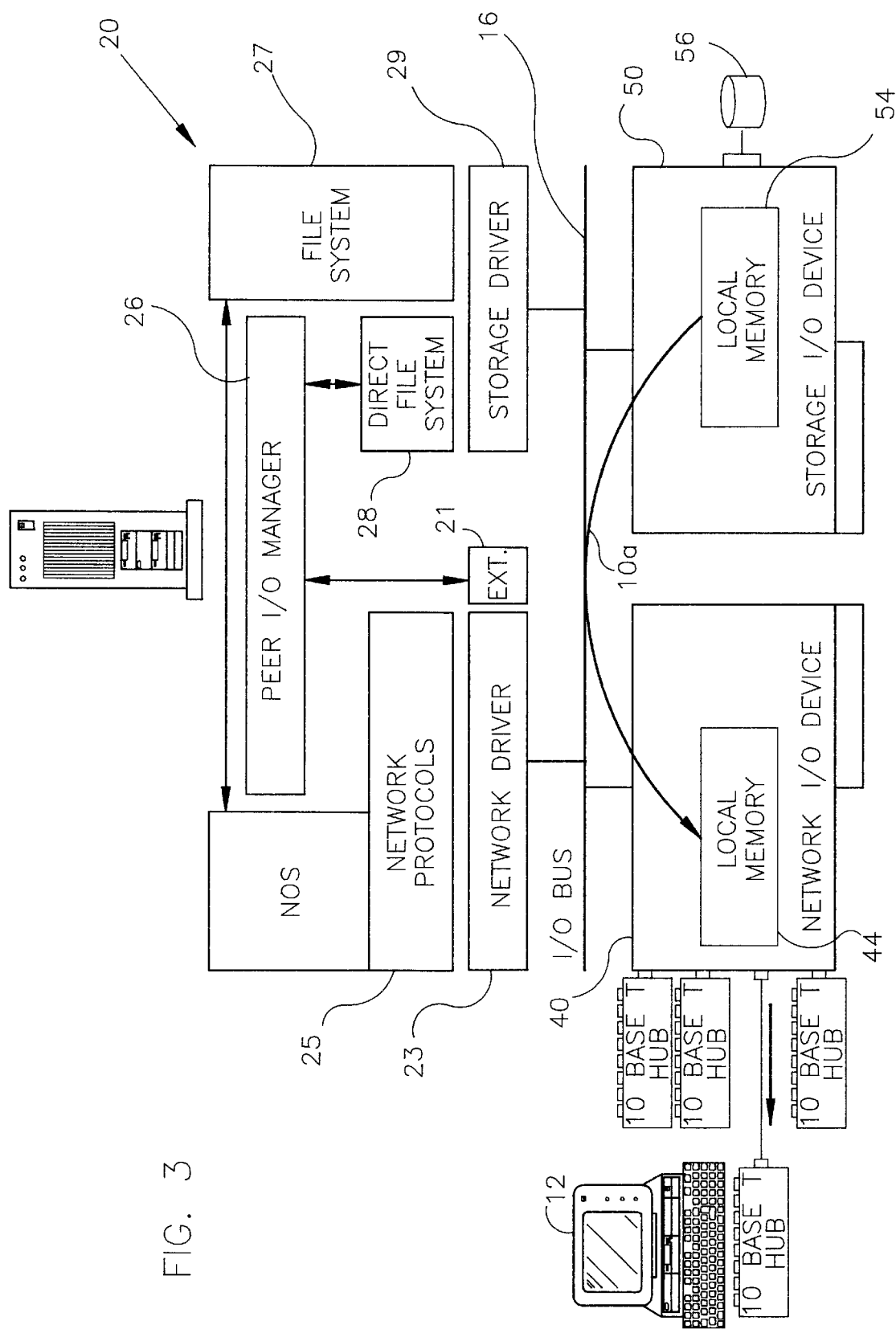
FIG. 3 is a block diagram illustrating the server based hardware and software component of the instant invention.
Figure 4:
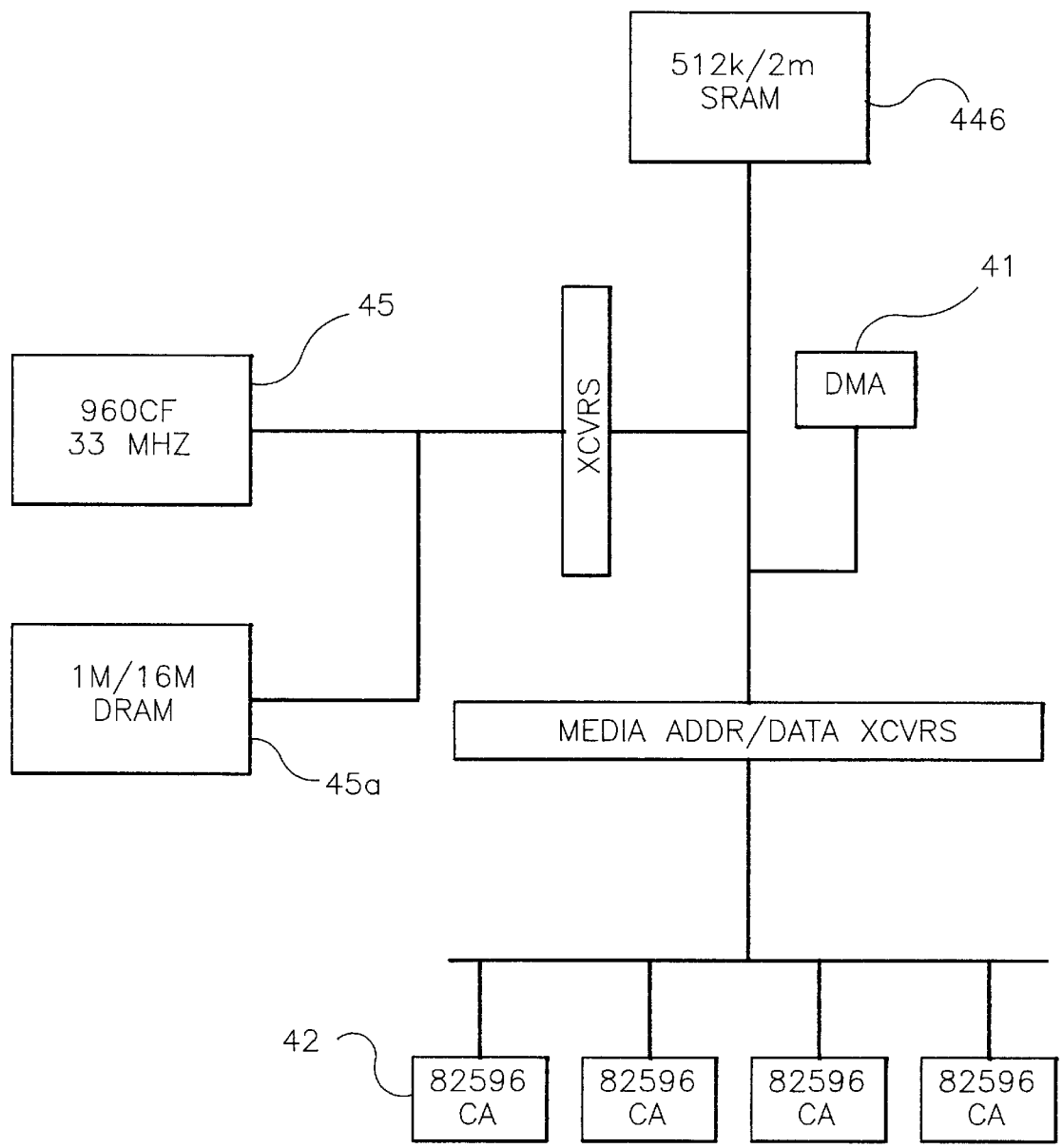
FIG. 4 is a block diagram of the basic hardware components of the instant invention illustrating the network I/O device architecture.
Figure 5:
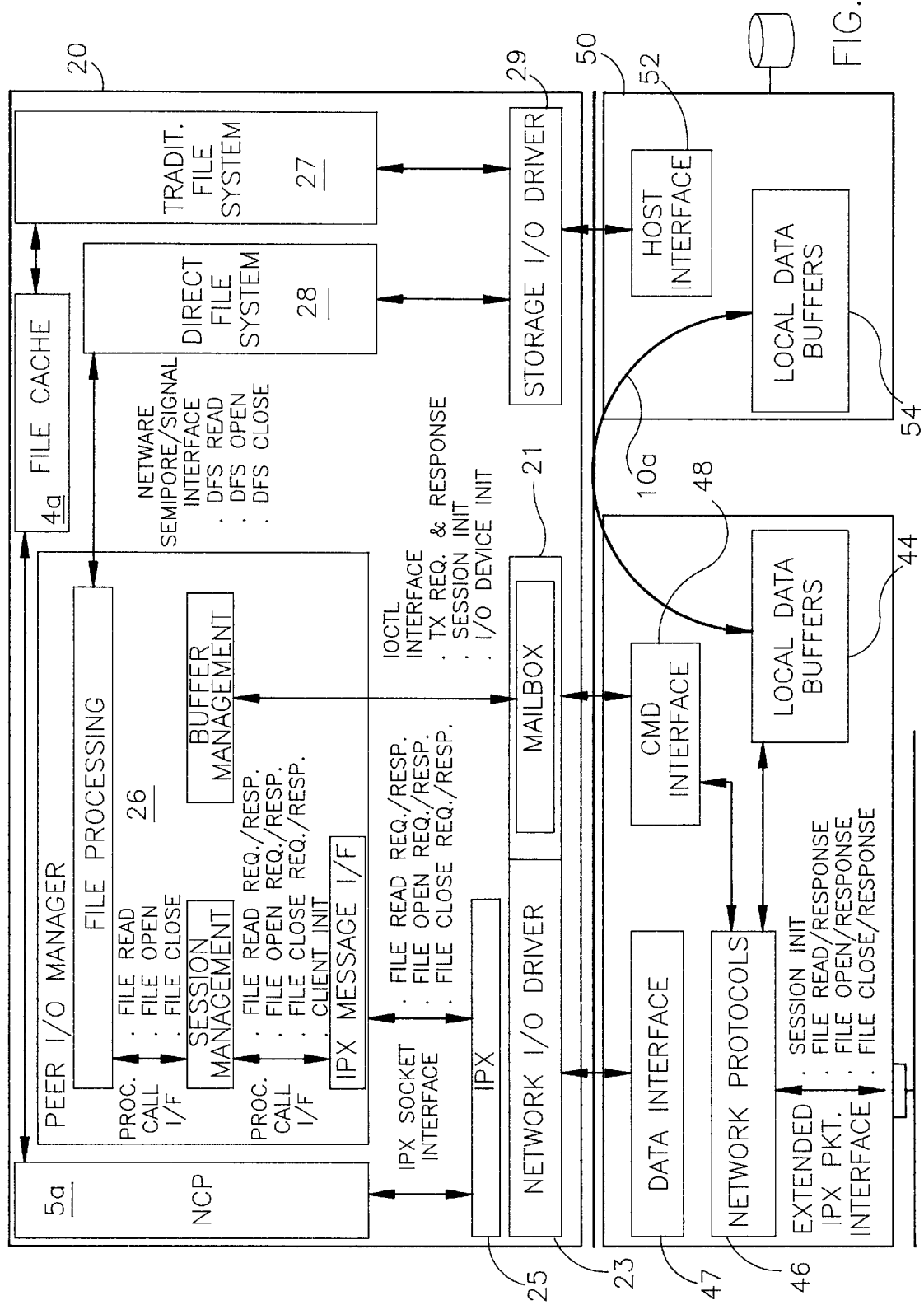
FIG. 5 is a block diagram of the server system of the instant invention illustrating the basic software box comprising the Peer I/O Manager and its function in the server in accordance with the instant invention.

With reference to the drawings, FIGS. 2–10 depict the preferred embodiment of the client/server data delivery and retrieval system 10 and method 100 of the instant invention. The instant invention 10 and 100 accomplishes direct data transfer between I/O devices by novel peer I/O operations and solutions. The instant invention generally comprises a planar board 20 having main CPU(s) 24 and main dynamic memory 22, and I/O devices 30. The I/O devices 30 include a network I/O device 40 (as shown in FIG. 4) having a plurality of network controllers 42 and local data buffers 44, and a storage I/O device 50 comprising a host interface 52, local data buffers 54 and at least one storage disk 56.

FIGS. 2 and 3 illustrate the preferred server solution of the instant invention using Peer I/O direct data transfer techniques. With the architecture and methods of the instant invention 10, 100 data is moved from a storage bus I/O Device 50 (source device) to the network I/O Device 40 (destination device) along path 10A as it is transferred directly from data buffers 54 local to storage I/O Device 50 to data buffers 44 local to network I/O Device 40. One of two adapters, preferably the network I/O device 40, acts as a slave, while the other, such as the storage I/O device 50, acts a bus master. Thus, a single data transfer across the I/O bus 16 between peer I/O devices, such as the network I/O device 40 and the storage I/O device 50, is achieved. The peer I/O operations of the invention are characterized by a single data transfer between source and destination I/O devices 30, which is accomplished with minimal burden to the CPU(s) 24, except for initial setup, and main CPU dynamic memory 22, to be discussed more fully herein.

Regarding hardware enablement, at lest one of the I/O devices 40 or 50 capable of Peer I/O communication must be able to act as a bus master and the other as a slave. Devices capable of Peer I/O communication must contain local memory and be able to map a portion of that memory onto the system's I/O bus address space 16. The ability of one I/O device, 50 and 40, to issue a direct interrupt to a Peer I/O device, 50 or 40 (over a standard I/O bus 16) is not a requirement for Peer I/O, however, this feature merits mention because it is key to reducing latency in Peer I/O operations.

Figure 1:
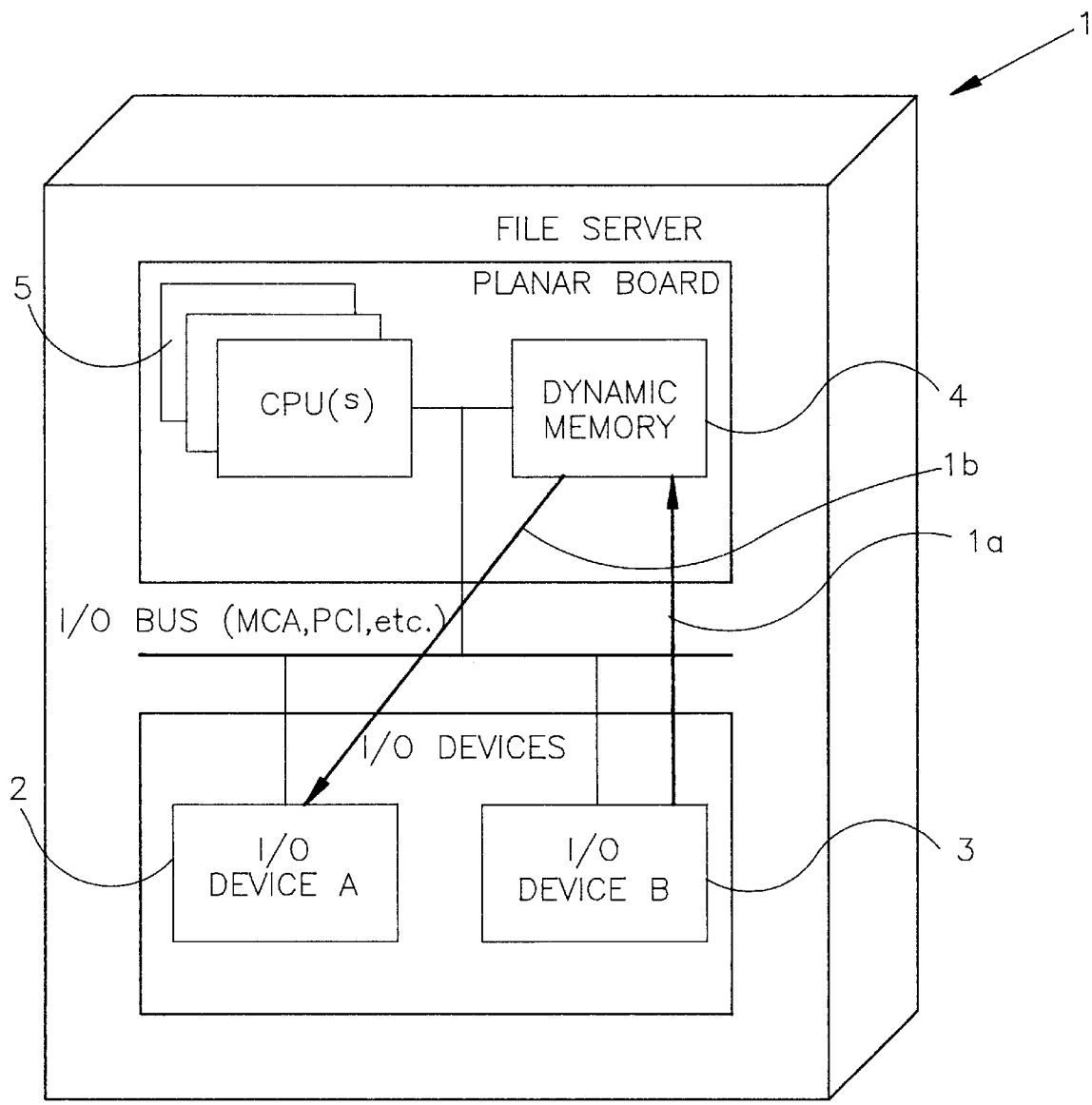
FIG. 1 is a block diagram of a prior art file server illustrating the prior art flow of data from storage Device B to Network Device A.

The following discussion addresses preferred server implementation. With reference to peer data transfers between Storage I/O device 50 and Network I/O device 40 (via I/O bus 16) as seen in FIG. 3 and 4, the instant invention comprises a peer I/O server solution based upon a key software component referred to throughout as the Peer I/O Manager. FIG. 3 illustrates the basic data flow of this product across path 10A, whereby, data preferably only flows once across the system bus 16. Furthermore, intensive network protocol and packet transmission processing that normally burdens the Planar-board CPU is offloaded to a high-performance RISC processor on-board each Network I/O Device 40. In contrast, FIG. 1 illustrates the old flow of data in a traditional file server.

The preferred implementation is a high-performance data delivery mechanism for Peer I/O's, designed to optimize file server 20 throughout. This preferred implementation is comprised of the following major components as shown in FIG. 3.

Referring to FIG. 3 a basic block diagram of the preferred implementation server solution 20 of the invention is shown. The basic components include an intelligent Network I/O device 40 and a Storage I/O device 50 (both capable of Peer I/O), software extensions 21 to the traditional Network I/O Device driver 23, and a software component called Peer I/O Manager. The various components serve the following basic functions discussed below with reference to an intelligent network I/O device 40, the storage I/O device 50, Peer I/O Manager software 26, the network I/O device driver extensions 23 and network attached client software extensions.

The intelligent Network I/O device 40 components provide buffering for raw data accepted from the Storage I/O Device 50 through Peer I/O data transfers. The Network device 40 also provides sufficient processing power to perform network protocol processing of the raw data from Network Protocols 25 and distribution of the processed data to the Network Attached Clients 12. It should be noted that one, or more, Network or Storage I/O Devices may simultaneously participate in the preferred implementation without departing from the scope and spirit of the instant invention.

The Storage I/O Device 50 provides permanent storage of program and data files used by the Planar-board CPU(s) 24 and Network Attached Clients 12. Again, one, or more, Storage I/O Devices 50 may simultaneously participate in the preferred implementation functionality.

The Peer I/O Manager software component 26 provides the program control necessary to co-ordinate and initiate Peer I/O data transfers from the Storage I/O Device 50 to the Network I/O Device 40. The Peer I/O Manager software component is able to simultaneously control one, or more, Storage and Network I/O Devices. The Network I/O Device Driver Extensions 21 provide a message passing interface between software components on the Network I/O Device 40 and the Peer I/O Manager software 26 component.

In addition to the above mentioned software and hardware components that reside on a file server, the Network Attached Client includes Software redirector extensions. The client redirector extension and Peer I/O Manager are communication peers. The purpose of client redirector extension is to differentiate and expedite requests to be processed by the Peer I/O Manager function in the file server 10 of the invention. To permit the above mentioned components to inter-operate, the preferred embodiment utilitizes basic software interfaces, such as network protocols 46, data interface 47, command interface 48, network device driver extension interface 21 and a direct file system interface 28. The network protocols 46 is an efficient network protocol that permits high-performance data transfers between the intelligent Network I/O Device 50 and Network Attached Clients 12. The command interface 48 is an interface to permit control messages to be passed between the intelligent Network I/O Device 40 and the Network I/O Device driver 23 as it executes on the Planar-board CPU 24. The data interface 47 is an interface to permit data to be passed from the intelligent Network I/O Device 40 to the Network I/O Device driver 23. The network device driver extension interface 21 is an interface to permit control messages to be passed from the Network I/O Device driver to the Peer I/O Manager software component. The direct file system interface permits control messages to be passed from the Peer I/O Manager software component to the Direct File System 28 (DFS).

With reference to FIG. 4, there is shown a block diagram view of the basic hardware components that comprise the Network I/O Device architecture 40. The main components of the Network I/O device 40 of primary interest contributing to its ability to act as a Peer I/O Device include a DRAM 45a, SRAM 44, a processor 45 and a direct memory access (DMA) controller. The SRAM 44 is an acronym for Static Random Access Memory as is well known in the art. It provides for local memory on the Network I/O Device. The SRAM 44 component provides high performance memory used to buffer data received during data transfer from the I/O bus or Ethernet network controllers, such as 82596 chips. Throughout this disclosure the SRAM 44b component is also referred to as the Network I/O Device Local Memory 44. DRAM 45a is an acronym for Dynamic Random Access Memory as is well known in the art. The DRAM 45a provides high performance memory used as program and data storage for the processor 45. The processor preferably comprises the Intel 960CF RISC processor or similar processors. The processor 45 provides the processing power that enables the Network I/O device 40 to off load functions traditionally performed by the planar-board CPU 24. The DMA 41 is a high-performance PCI bus interface controller as is well known in the art, and may include a 9060 PLX. The DMA 41 provides slave/master DMA access to the SRAM 44 component. It also enables peer I/O devices to directly interrupt the processor 45. These two functions are the key hardware enablers of Peer I/O functionality. The other components in the Network I/O Device may also include Ethernet controllers, on-board timers, and non-volatile flash memory.

The preferred implementation defined herein is based upon, but not restricted to, a four port, bus master, Ethernet Network I/O Device, illustrated in FIG. 4.

Figure 9:
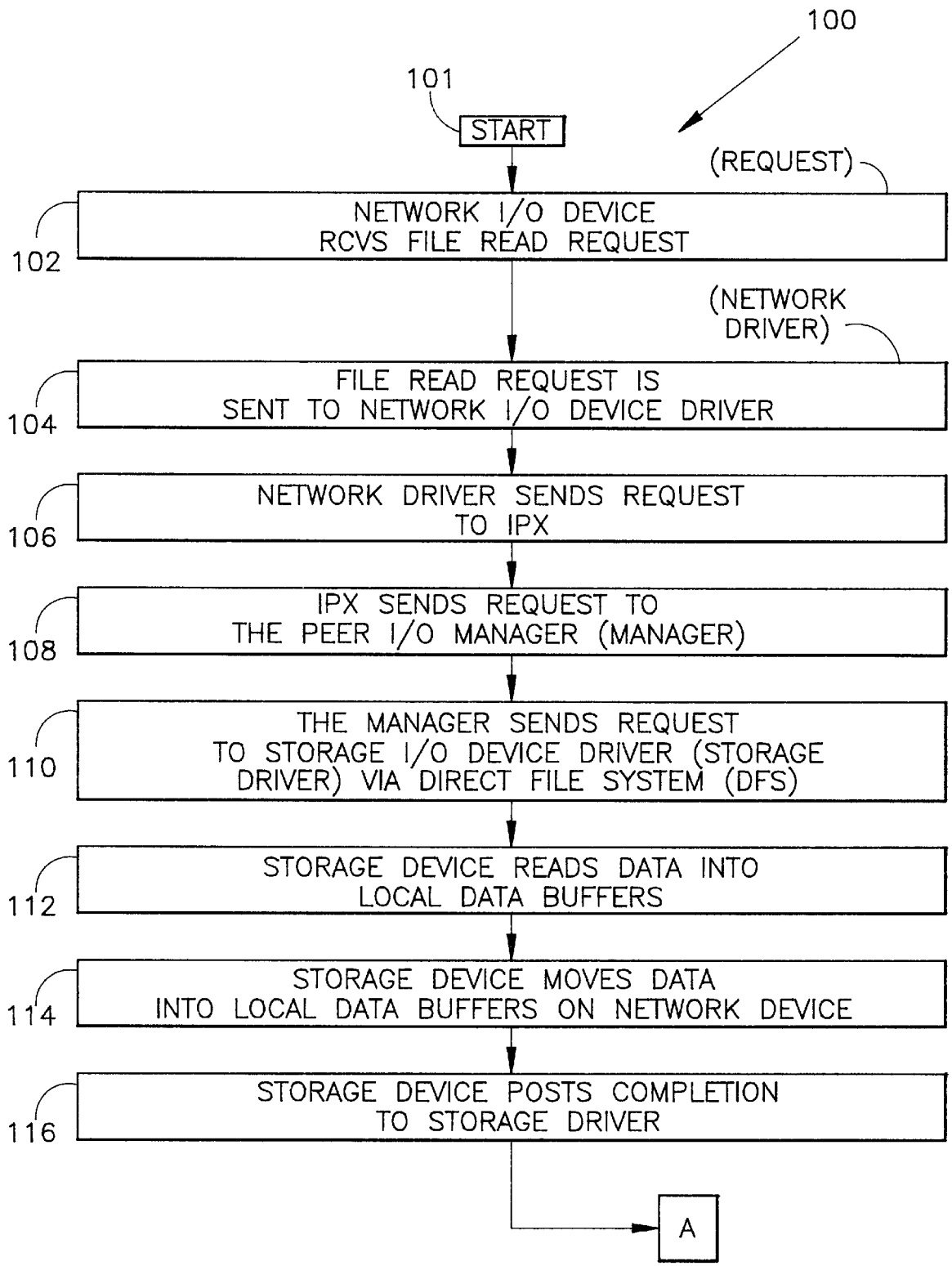
FIG. 9 is a flow chart of the instant invention illustrating the flow of code instructions necessary for directing data.
Figure 9:
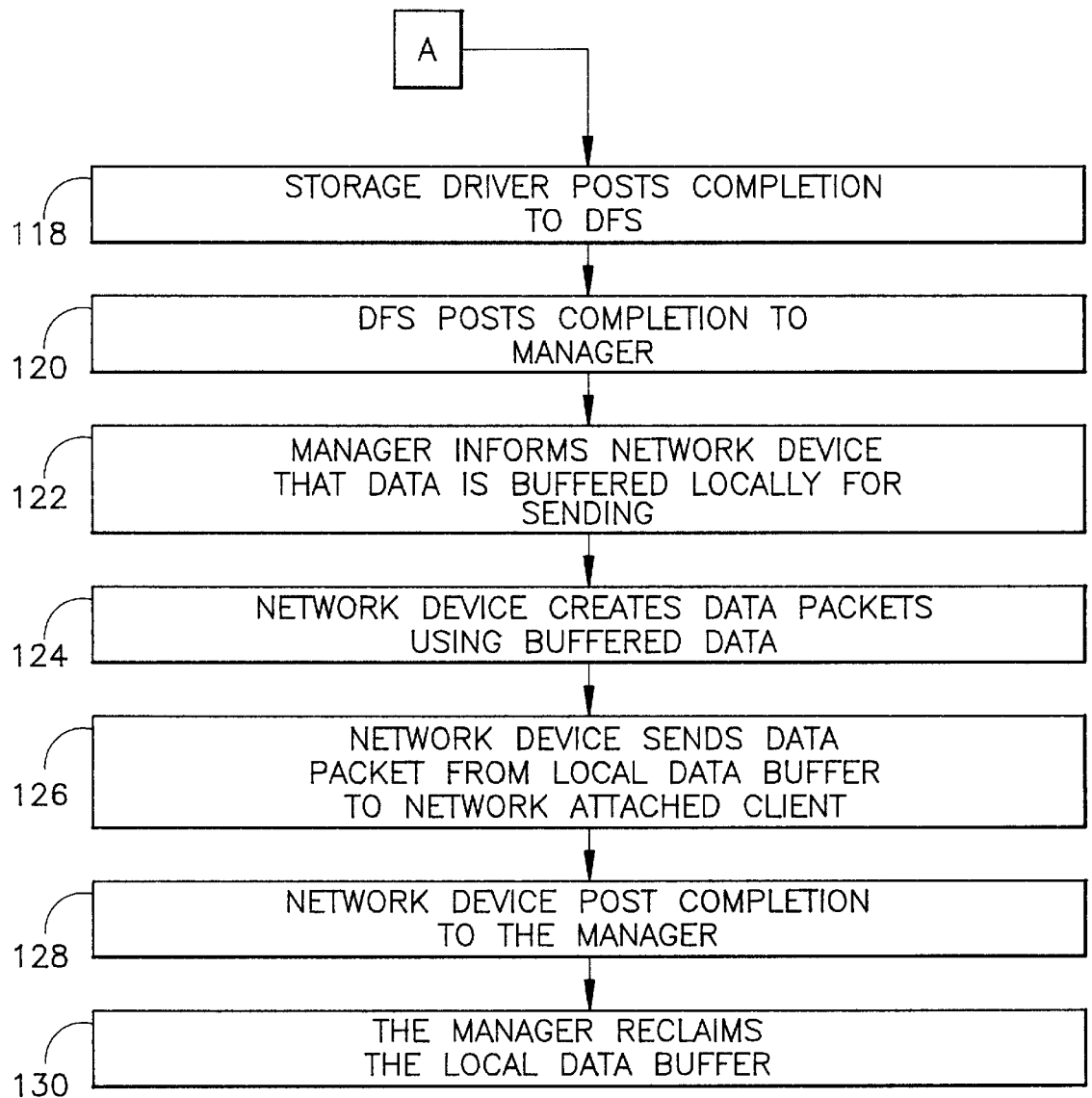

Peer I/O Manager uses low level file system primitives such as the NetWare™ Direct File System (DFS) 28 to issue direct read requests to the Storage I/O Device 50. File read memory buffers 44 are local to the Network I/O Device 40, so that Peer I/O data transfers are accomplished via planar-board CPU 24 control. The Network Protocol 46 software component on the network I/O device 40 is responsible for creating network layer data packets using the raw file data and sends the data to Network Attached Clients 12. With reference to FIG. 9, the basic flow of data through the file server is as follows:

A. A file read request is received by the Network I/O Device.

B. The read request is passed to the Network I/O Device driver.

C. The Device driver passes the request to The Network Layer Protocol (IPX).

D. IPX passes the request to Peer I/O Manager.

E. Peer I/O Manager passes the request to the Storage I/O Device driver via the Direct File System (DFS).

F. The Storage I/O Device reads the data into local data buffer.

G. The Storage I/O Device moves the data into local data buffers on the Network I/O Device.

H. The Storage I/O Device posts completion to the Storage I/O Device driver.

I. The Storage I/O Device driver posts completion to DFS.

J. DFS posts completion to Peer I/O Manager.

K. Peer I/O Manager informs the Network I/O Device that data is buffered locally for transmission.

L. The Network I/O Device creates network data packets using the locally buffered data.

M. The Network I/O Device transmits the data packet from local memory to the Network Attached Client.

N. The Network I/O Device posts completion status to Peer I/O Manager.

O. Peer I/O Manager reclaims the data buffers associated with the transfer. In contrast to the preferred implementation, the flow of data through a traditional Netware™ file serve would be as follows:

A. A file read request is received by the Network I/O Device.

B. The read request is passed to the Network I/O Device driver.

C. The Device driver passes the request to IPX.

D. IPX passes the request to the application layer protocol (Netware™ Core Protocol (NCP)).

E. NCP passes the request to the Storage I/O Device driver via the traditional file system.

F. The Storage I/O Device reads the data into local data buffers.

G. The Storage I/O Device moves the data into the Planar-board memory.

H. The Storage I/O Device posts completion to the Storage I/O Device driver.

I. The Storage I/O Device driver posts completion to NCP.

J. NCP retrieves the data from the File Cache and passes it to IPX.

K. IPX creates network layer data packets out of the data and passes it to the Network I/O Device driver.

L. The Network I/O Device driver passes the transmit request to the Network I/O Device.

M. The Network I/O Device retrieves the data from Planar-board memory into local memory.

N. The Network I/O Device transmits the data packet from local memory to the Network Attached Client.

O. The Network I/O Device posts completion status to the Network I/O Device driver.

P. The Network I/O Device driver posts completion status to IPX.

Q. IPX reclaims the data buffers associated with the transfer.

Accordingly, the data path taken crosses the I/O Bus 16 more than once and burdens the server CPU(s) 5. The initial implementation of Peer I/O Manager 26 is designed to expedite file read operations, because it is believed that read operations are perceived as more time critical than write operations. This is true for applications such as video playback. However, the basic preferred implementation is fully capable of performing file write operations through Peer I/O.

Networked Attached Client Extensions are also present in the instant invention. The block diagram in FIG. 6 includes the software layers present on a Network Attached Client and required for communicating with the Peer I/O Manager 26 in the file server. The client redirector extension 12c is preferred for the current preferred implementation. This layer of software 12c interacts with application software 12a running on the client station 12 and with the Peer I/O Manager 26—via a streaming protocol. The client redirector extension 12c permits a client station user to create a logical drive and map that drive to a volume controlled by the Peer I/O Manager 26. The client redirector extension is implemented as a terminate and stay resident (TSR) executable under DOS and Windows 3.1x.

Dynamic Link Library (DLL) versions of client redirector extension are also implementable for 32 bit operating systems, such as Windows NT, Windows 95 and OS/2. These extensions intercept all requests to the standard redirector interrupt (int 2Fh) and shares it with a standard requester, such as the NetWare ™requester (netx.com or vlm.exe). Requests for the logical drive controlled by Peer I/O Manager 26 are passed to the streaming protocol in 12c and all other requests are passed to the standard requester, and processed by protocols such as the NetWare™ Core Protocol (NCP).

Note that it is possible to provide Peer I/O solutions in a file server without client extensions such as the client redirector extension. The client redirector extension provides a streaming protocol that makes it easy for software layers in the file server to determine when to provide Peer I/O data transfers. The Peer I/O Manager software could, however, dynamically decide to perform Peer I/O based upon an observation of file read patterns being issued by standard requestors.

The client redirector extension is invoked with the command line parameters:

A. Mandatory: The logical drive letter to be associated with Peer I/O Manager.

B. Mandatory: The physical volume on the server to map the services to.

C. Optional: A flag to enable local read-ahead and data caching. If enabled, the client redirector extension will request data from the Peer I/O Manager in advance of being requested to do so by higher layer software applications.

D. Optional: A byte count to specify the size of read-ahead requests sent to the Peer I/O Manager. A default read size shall be sued if this argument is not present.

E. Optional: A byte count to specify the size of read-ahead buffers. A default buffer size shall be used if this argument is not present. During initialization, the client redirector extension performs NCP registration of the client station with the server. This process consists of:

A. Login to the server (if not already done)

B. Security checking

C. Directory service (if NetWare ™4.x server)

D. Locale check

E. Volume check Once registered, the client redirector extension is ready to accept transfer requests. File I/O requests issued to the drive letter registered with the Peer I/O Manager 26 are passed to the streaming protocol. The streaming protocol translates these requests into protocol transactions with the Peer I/O Manager in the server as defined in the following section referenced as "Client Redirector Extension to Peer I/O Manager Frame Formats".

FIG. 7 illustrates the fields that comprise a data packet that is sent between a Netware™ client and a File Server. The packet is comprised of a Media Access Control (MAC) header, an IPX header, and a Data section. These fields are subdivided as follows:

| | |
|---|---|
| DA | This acronym stands for Destination Address. This 6 byte field is part of the Media Access Control header. It specifies an Ethernet address of the intended end station(s). This is the first field of the data packet to be sent onto the Ethernet. |
| SA | This acronym stands for Source Address. This 6 byte field is part of the Media Access Control header. It specifies an Eternet address of the initiating station. |
| T/L | This acronym stands for Type/Length. This 16 bit field is part of the Media Access Control header. If the value in this field is greater than or equai to 2000, then this field indicates the byte count of the data packet, else the value specifies the protocol type of the remaining packet. |
| IPX_chksum | This is the IPX Checksum. This 16 bit field is part ot the IPX header. This field is currently set to a value of 0xFFFF. The current implementation of IPX does not support software checksums. |
| IPX_len | This is the IPX length. This 16 bit field is part of the IPX header. The value in this field contains the length of the IPX_Data field. |
| IPX_TC | This is the IPX Transport Control. This one byte field is part of the IPX header. This field is used by routers to log the number of times that a packet has been forwarded. |
| IPX_PT | This is the IPX Packet Type. This one byte field is part ot the IPX header. This field indicates the type of service that a packet will use ((IPX/SPX/NCP). |
| IPX_DA | This is the IPX Destination Address. This field is part of the IPX header. This field is comprised of three sub-fields that define the address of the destination station as follows: Destination Network: 4 byte field. Destination Node: 6 byte field. Destination Socket: 2 byte field. |
| IPX_SA | This is the IPX Destination Address. this field is part of the IPX header. This field is comprised of three sub-fields that define the address of the source station as follows: Source Network: 4 byte field. Source Node: 6 byte field. Source Socket: 2 byte field. |
| IPX_Data | This is the IPX Data. This variable length field contains data that is being delivered by the IPX protocol. The data shall be delivered to the application(s) that accept data from the Destination Socket on the Destination Network/Node. Typically, this field contains data for the higher layer protocols, such as NCP. |

The IPX—Data field is variable in length and contains data passed by the IPX protocol layer to the next higher software layer. This data is formatted by the next higher layer protocol. The IPX protocol processing layer is designed to provide simultaneous support to multiple higher layer protocols. The IPX software layer acts much like a mailman. It delivers packets to higher layer protocols through a post office box-like scheme. The IPX layer uses the Destination Socket in the IPX Header field of each incoming packet as the postal address that associates incoming data packets with specific higher layer protocols. Protocols register with IPX to receive packets addressed to specific Socket IDs.

FIG. 7, illustrates the NetWare™ Core Protocol (NCP) as a software layer above IPX. IPX delivers data packets addressed to Socket number 451 to NCP. Traditionally, NetWare™ client-based redirectors send file requests to the NCP socket ID in the file server.

The Peer I/O Manager, like NCP, is a protocol layer that accepts data packets addressed to its own unique Socket ID in a file server. The client redirector extension is a client-based software protocol layer that addresses file requests to the Peer I/O Manager socket ID in the file server.

Peer I/O Manager and Client redirector extension software layers co-exist with NCP software layers in a file servers and Network Attached Clients. Thus, Peer I/O manager services co-exist with traditional file server functions the NCP protocol facilitates file open/close/read/write operations between traditional Network Attached Clients and file servers. NCP facilitates file read/write requests through Planar-board Centric I/O data transfers, i.e. all data moves through the File Cache in Planar-board memory. Peer I/O Manager, however, facilitates file read/write requests through Peer I/O data transfers, i.e., all data moves directly from Storage I/O device Local Memory to Network I/O Device Local Memory.

The Peer I/O Manager and client redirector extension communication protocol layer is placed into the IPX—Data field of data packets and is formatted as follows:

| Filed Name | Size | Description |
| --- | --- | --- |
| FunctionCode | 1 byte | This field, filled in by the client redirector extension, describes the function of the function of the packet as follows: 00 = Reserved; 01 = file open; 02 = file read; 03 = file close; 04 = read retry |
| FileName | 150 bytes | This field, filled in by the client redirector extension, provides the name of the file associated with the requested function. This field is meaningful only on file open requests. |
| ServerReadAhead | 1 byte | This field, filled in by the client redirector extension, requests the Peer I/O Manager 26 to double buffer file read data on the network I/O device. Client Redirector Extension may dynamically alter the state of this flag while reading from an opened file. 00 = Read file data only as requested; 02 = Read file data ahead of actual requests |
| FileHandle Index | 32 bit | This field, filled in by the client redirector extension for an open request, provides the Peer I/O Manager with open modes associated with the open operation. For a full description of file open modes, refer to the DOS Technical Manual - Interrupts 21 and 6c. |
| ActionCode | 16 bit | This field, filled in by the client redirector extension for an open request, provides the Peer I/O Manager with action codes associated with the open operation. For a full description of action codes, refer to the DOS Technical Manual - Interrupts 21 and 6c. |
| Attributes | 16 bit | This field, filled in by the client redirector extension for an open request, provides the Peer I/O Manager with open attributes associated with the open operation. For a full description of file attributes, refer to the DOS Technical Manual - Interrupts 21 and 6c. |
| ConnectionID | 32 bit | Each Peer I/O Manager-based server must have a connection ID unique to each Network Attached client redirector extension client. This value remains constant as long as the client remains attached to the file server. This field, filled by the client redirector extension for all requests, provides Peer I/O Manager with unique connection ID. |
| OriginalFileSize | 32 bit | This field, filled by Peer I/O Manager in response to open. request's provides the client redirector extension-based client with the original size of a file being opened. |
| ReadOffset | 32 bit | This field, filled in by the client redirector extension for read requests, provides the Peer I/0 Manager with a file position for the start of the requested read operation. The starting position is expressed as a byte offset, from byte zero of the specified file. |
| BytestoRead | 16 bit | This field, filled in by the client redirector extension for read requests, provides the Peer I/O Manager with a byte count of data to be read from the specified file, starting at the ReadOffset into the file. |
| Retryslot | 16 bit | This field, filled in by the client redirector extension for read retry requests, provides the Peer I/O Manager with the SocketID associated with the original data read request. |
| ReturnCode | 32 bit | This field, filled in by Peer I/O Manager in response to open and close requests, provides the client redirector extension-based client with completion status and confirmation of the requested operation. |

In response to file read requests, the Peer I/O Manager transmits file data to the client redirector extension-based clients via raw IPX data packets. This means that no higher layer protocol information is contained in the IPX—Data field. The client redirector extension relies upon the SocketID in the IPX Header to properly assemble and process the received data.

The client redirector extension does not specifically acknowledge received data, however, Retry packets serve the function of a non-acknowledgement or reject, and a successive read acts as an implied acknowledgement of all previously sent data.

FIG. 8 illustrates the basic flow of command and file information through the various interfaces that comprise the Peer I/O solution called the Peer I/O Manager and client redirector extension. The various interfaces are listed at the top of the diagram. FIG. 7 illustrates a block diagram view of the routines that process requests and replies at these interfaces. The following is a brief description of the interfaces and associated processing routines:

| Interface | Description |
| --- | --- |
| Direct File System | The Direct File System is object code provided by Novell that links directly to the Peer I/O Manager. Thus, the Peer I/O Manager is able to make direct procedure calls to DFS functions. The NetWare ™ kernal permits the Peer I/O Manager to place calls to DFS and sleep until the requested operation completes. This is accompolished via Semaphore/Signal functions of NetWare ™. DFS returns control to a Peer I/O Manager callback routine, when a requested function completes. |
| Peer I/O Manager IPX Socket | The IPX Socket interface is basically a Semiphore/Signal. A software layer, such as Peer I/O Manager, posts a request to IPX for incoming packets that are addressed to a particular Destination Socket ID. the software then goes to sleep and is re-awakened when an incoming packet is available for processing. |
| Peer I/O Manager IOCTL | The Peer I/O Manager IOCTL interface is basically a Semiphore/Signal. A Peer I/O Manager posts a request for incoming mailbox messages to the Network Driver. A Peer I/O Manager then goes to sleep and is re-awakened when an incoming message is available for processing. |
| Network Driver Mailbox | The mailbox is actually located in a portion of Network I/O device Local data buffer that is readily accessible to both the Planar-board and the network I/O device on-board CPUs. When either processor places a messge into the mailbox, an interrupt is issued to signal the event to the other processor. Planar-board CPU interrupts are fielded by the Network I/O Driver. The Network I/O device interrupts are fielded by a layer of software called the Host API, and control is then passed to mailbox processing interface routine. |
| Adapter Mailbox | The Network I/O device has a set of routines that process messages placed into the shared memory mailbox. Collectively, these routines are called the 'command interface' in FIG. 7. |
| Client Redirector Extension IPX Sockets | The Peer I/O Manager 26 and client redirector extension exchange IPX-based streaming data protocol packets. The format of these packets are defined in the section referenced as, client redirector extension to the Peer I/O Manager 26 Frame Formats. Routines that initiate and process data packets associated with this protocol reside within Peer I/O Manager on the server and client redirector extension on a Network Attached Client. |

FIG. 8 illustrates the basic steps of opening, reading and closing a file from a client redirector extension-based client. Arrows represent the flow of command messages and file data across the various interfaces. The caption on each arrow indicates the message type. The following table briefly describes the steps illustrated in FIG. 8.

| Step Number | Description |
| --- | --- |
| 1 | NCP Initialization: This process involves multiple steps. During this process, the client redirector extension-based client performs all initialization that is required by NCP. The packets generated by client redirector extension are sent to the standard NCP socket in the file server. The following NCP initialization takes place (it unnecessary to describe these steps for the purpose of this patent). <br> (a) Login to the server (if not already done) <br> (b) Security checking <br> (c) Directory service (If NetWare ™ 4.x server) <br> (d) Locale check <br> (e) Volume check |
| 2 | NCP Initialization Response: NCP in the file server responds to each process listed in step 1 above. |
| 3 | File open Request: On behalf of a request from higher software layers, the client redirector extension builds a File Open Request packet and sends this packet to the Peer I/O Manager socket in the file server. The format of this packet is described in the section entitled "Client Redirector Extension to Peer I/O Manager Frame Formats". |
| 4 | DFS Open: In response to the File Open request, Peer I/O Manager issues a File Open Request to the Direct File System (DFS). The syntax of this request is described in the Novell NetWare ™ NLM SDK. |
| 5 | DFS Open Response: In response to the DFS File Open request, DFS opens the requested file and issues a response to Peer I/O Manager. The syntax of this response is described in the Novell Netware ™ NLM SDK. |
| 6 | Connection Initialization: In response to the DFS File Open response, Peer I/O Manager builds a Connection Initialization message and passes the message to the Network Driver. The Network Driver, in turn, places this message in the shared memory mailbox and interrupts the network I/O devices processor. The mailbox message contains a session ID and information required by the network I/O device firmware to build IPX headers and transmit the packets to the client redirector extension-based client. The session ID is a numeric handle used to identify a specific file transfer session on subsequent Transmit Request and Connection Terminate commands. |
| 7 | Connection Initialization Response: In response to the Connection Initialization Request, the network I/O device firmware initialized the requested session and builds a Connection Initialization Response message. the message is placed into the shared memory mailbox and the Network Driver is interrupted. The Network Driver, in turn, passes the message to the Peer I/O Manager 26. The mailbox message contains a session ID to identify the appropriate session. |
| 8 | File Open Response: In response to the Connection Initialization Response, the Peer I/O Manager 26 builds a File Open response packet and sends this packet to the client redirector extension command IPX socket in the file server. The format of this packet is described in the section entitled "Client Redirector Extension to Peer I/O Manager 26 Frame Formats". |
| 9 | File Read Request: On behalf of a request from higher software layers, the client redirector extension builds a File Read Request packet and sends this packet to the Peer I/O Manager socket in the file server. the format of this packet is described in the section entitled "Client Redirector Extensions to Peer I/O Manager Frame Formats". |
| 10 | DFS Read: In response to the File Read Request, the Peer I/O Manager 26 issues a File Read request to the Direct File System (DFS). The syntax of |

-continued

| Step Number | Description |
|---|---|
| | this request is described in the Novell NetWare ™ NLM SDK. The destination buffer for the requested read operation is local memory on the network I/O device adapter. This read operation is the basis of the Peer I/O data movement. |
| 11 | DFS Open Response: In response to the DFS File Read request, DFS reads the request file data to the PeerSwitch adapter buffers and issues a response to Peer I/O Manager. the syntax of this response is described in the Novell Netware ™ NLM SDK. |
| 12 | Tx Request: In response to the DFS File Read response, the Peer I/O Manager builds a Transmit Request message and passes the message to the Network Driver. the Network Driver, in turn, places this message in the shared memory mailbox and interrupts the network I/O device processor. The mailbox message contains a session ID and information required by the network I/O device firmware to build IPX headers and transmit the packets to the client redirector extension-base client. |
| 13 | File Read Data: In response to the Tx Request, the network I/O device firmware uses the file data provided by DFS Read to build IPX data packets for transmission to the client redirector extension-based client. The packets are then transmitted to the client. |
| 14 | Tx Complete: When each of the IPX packets have been sent to the client redirector extension-based client, the network I/O device firmware builds a Tx Complete message. the message is placed into the shared memory mailbox and the Network Driver is interrupted. The Network Driver, in turn, passes the message to Peer I/O Manager. The mailbox message contains a session ID to identify the appropriate session. |
| 15 | Repeat till EOF: Steps 9 through 14 will repeat until the end of file (EOF) is reached or the process is terminated for some other reason. |
| 16 | File Close Request: On behalf of a request from higher software layers, client redirector extension builds a File Close Request packet and sends this packet to the Peer I/O Manager socket in the file server. The format of this packet is described in the section entitled "The Client Redirector Extension and Peer I/O Manager Frame Formats". |
| 17 | DFS Close: In response to the File Close request, Peer I/O Manager issues a File Close request to the Direct File System (DFS). The syntax at this request is described in the Novell Netware ™ NLM SDK. |
| 18 | DFS Close Response: In response to the DFS File Open request, DFS closes the requested file and issues a response to Peer I/O Manager. The syntax of this response is described in the Novell NetWare ™ NLM SDK. |
| 19 | Connection Terminate Request: In response to the DFS File Close response, Peer I/O Manager builds a connection Terminate Request message and passes the message to the Network Driver. The Network Driver, in turn, places this message in the shared memory mailbox and interrupts the network I/O device adapter processor. The mailbox message contains session ID to specify the terminated session. |
| 20 | Connection Terminate Response: In response to the Connection Terminate Request, the network I/O device firmware terminates the requested session and builds a Connection Terminate Response message. The message is placed into the shared memory mailbox and the Network Driver is interrupted. The Network Driver, in turn, passes the message to Peer I/O Manager. The mailbox message contains a session ID to identity the appropriate session. |
| 21 | File Close Response: In response to the Connection Terminate Response, Peer I/O Manager builds a File Close Response packet and sends this packet to the client redirector extension command and IPX socket in |

-continued

| Step Number | Description |
|---|---|
| | the file server. The format of this packet is described in the section referenced as "Client Redirector Extension to Peer I/O Manager Frame Formats". |

Peer I/O may also be employed as the basis of a preferred solution based upon direct data transfers among any number of peer Network I/O devices. FIG. 2 illustrates a simple example of this preferred solution. Two network attached clients (A and B) each reside on separate networks (1 and 2). Network traffic from client A to client B follows the following basic path:

(a) Client A on Network 1 transmits a network packet addressed to Client B.

(b) Network I/O device 1 receives the data packet into a local buffer.

(c) Network I/O Device 1 interrogates the Destination Address (DA) of the data packet and searches a data base in local memory for an entry with a matching DA.

(d) Network I/O Device 1 finds an entry with a matching DA in the data base. The entry indicates that the destination device is located on Network 2.

(e) Network I/O Device 1 using a DMA device copies the data packet into data buffers that are local to Network I/O Device 2 and signals Network I/O Device 2 that a data packet has been copied to its memory and is waiting for transmission on Network 2. This signal process may be accomplished via a peer interrupt.

(f) Network I/O Device 2, in response to the signal, initiates the transmission of the data packet from local data buffers to Network 2.

(g) Client B copies the data packet from Network 2 into its own memory.

(h) Return traffic follows the same basic flow in the opposite direction.

The prior art solution to the forwarding traffic among clients on separate networks is based upon planar-board data buffers as follows:

(a) Client A on Network 1 transmits a network packet addressed to Client B.

(b) Network I/O Device 1 receives the data packet into a local data buffer.

(c) Network I/O Device 1 forward the data packet to planar-board receive buffers and signals the Network I/O Device Driver that data is available.

(d) The Network I/O Device Driver, processing on the planar board CPU, forwards the received packet to a Network Layer protocol, such as IPX.

(e) The Network Layer protocol interrogates the Destination Address (DA) of the data packet and searches a data base for an entry with a matching DA.

(f) The Network Layer protocol finds an entry with a matching DA in the data base. The entry indicates that the device is located on Network 2.

(g) The Network Layer protocol forwards the data packet to the Network I/O Device Driver that controls the Network I/O Device attached to Network 2.

(h) The Network I/O Device Driver signals to Network I/O Device 2 that a data packet is ready for transmission onto Network 2.

(i) Network I/O Device 2 using a DMA device copies the data packet from planar-board data buffers into local data buffers.

(j) Network I/O Device 2 initiates the transmission of the data packet from local data buffers to Network 2.

(k) Client B copies the data packet from Network 2 into its own memory.

(l) Network I/O Device 2 signals to the Network I/O Device Driver that the planar-board data buffers are now free for re-use.

(m) Return traffic follows the same basic flow in the opposite direction.

The invention may be implemented as a computer program product for distribution to an existing computer system. Such implementation may comprise a series of computer instructions either fixed on a tangible medium, such as a computer readable media, e.g. diskette, CD-Rom-91; Rom-93 or fixed disk 94 (FIG. 2), or transmittable to a computer system, via a modem or other interface device, such as communications controller 95 to the network, over a medium which can be either a tangible medium, including but not limited to optical or analog communications lines, or use wireless techniques, including but not limited to microwave, infared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave or other transmission technologies. It is contemplated that such a computer program product may be distributed as a removable media with accompanying printed or documentation, e.g., shrink wrapped software; preloaded with a computer system, e.g., on system ROM or fixed disk, or distributed from a server or electronic bulletin board over a network, e.g., the Internet or World Wide Web.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A data processing network comprising:

a plurality of client data processing units for processing application programs under the control of respective operating systems;

a server data processing unit coupled to said client units via respective network communication paths and including a server central processing unit (CPU), a server planar board memory, a storage input/output (I/O) device for storing program and data files for said client units, and a network I/O device for processing information under the control of a network operating system; and program controlled apparatus in said server unit rendered effective in response to certain read requests from said client units for transferring program and data files directly from the storage I/O device to the network I/O device for transmission to said client units, bypassing said server planar board memory.

2. The data processing network of claim 1, wherein:

a first local memory is provided in said storage I/O device for temporary storage of program and data file information;

a second local memory is provided in said network I/O device; and said program controlled apparatus includes means for transferring program and data file information from the first local memory directly to the second local memory via an I/O bus in the server unit for transmission to the client units in response to said certain requests from the client units.

3. The data processing network of claim 2, wherein said means included in the program controlled apparatus comprises:

a direct memory access (DMA) bus master mechanism in the storage I/O means, coupled to the first local memory and to the server I/O bus for effecting direct data transfer from the first local memory to the second local memory via said I/O bus.

4. The data processing network of claim 3, further comprising:

a local CPU in said network I/O device; and program controlled means in said network I/O device including said local CPU and said second local memory for organizing the program and data files transferred, to the second local memory, into the network data packets and for transmitting said packets to said client units via said network communication paths in accordance with said certain requests.

5. The data processing network of claim 2, wherein:

said I/O storage device includes a disk controller and at least one disk file for permanent storage of said program and data files and program controlled means for transferring information between said disk file and said first local memory in response to said certain requests.

6. The data processing network of claim 1, further comprising:

program controlled means in said server unit for transferring data, received by the network I/O device from the client units, directly from the network I/O device to the storage I/O device via the I/O bus in response to certain write requests.

7. A data processing network comprising:

a plurality of client data processing units for processing application programs under the control of respective operating systems;

a server data processing unit coupled to said client units via respective network communication paths and including a server central processing unit (CPU), a server planar board memory, a storage input/output (I/O) device for storing program and data files for said client units, and a network I/O device for processing information under the control of a network operating system; and program controlled apparatus in said server unit rendered effective in response to certain read requests from said client units for transferring program and data files directly between the I/O storage means and the network I/O device, bypassing said server planar board memory.

8. A client/server data delivery mechanism that enables delivery of data directly between selected I/O devices in a file server, said file server including a planar board central processing unit, said mechanism comprising:

a storage input/output (I/O) device for providing a source of data, said storage I/O device in electrical communication with said file server processing unit;

a network I/O device in electrical communication with said storage I/O device and said file server processing unit, said network I/O device being connectable to at least one client to manage data traffic to and from said client;

data flow control means, in electrical communication with said file server processing unit, for coordinating direct data transfer between said storage I/O device and said network I/O device along a predetermined path exclusive to said file server processing unit;

means, electrically communicating with said data flow control means and said network I/O device, for passing messages between said data flow control means and said network I/O device to facilitate initiating direct data transfers; and means, for transmitting data transfer request from said client to said file server processing unit.

9. A system as recited in claim 8, wherein said network I/O device includes a second data processing unit for processing network protocol inputs and data, facilitating distribution of the data to predetermined network attached clients.

10. A system as recited in claim 9, wherein said storage I/O device comprises a permanent storage medium for storing the data used by the network attached clients.

11. A system as recited in claim 10, wherein said network I/O device further includes a temporary memory buffer for temporarily storing the data delivered to network attached clients.

12. A system as recited in claim 11, wherein said storage I/O device includes a temporary memory buffer for temporarily storing the data delivered to said network I/O device, wherein said storage I/O device memory buffer is in electrical communication with said network I/O memory buffer for transferring the data from one memory buffer to the other memory buffer.

13. A system as recited in claim 12, wherein said data flow control means comprises processor readable medium of instructions, readable by said file server processing unit and said second processing unit for coordinating and initiating direct data transfers from said storage I/O device to said network I/O device.

14. A system as recited in claim 13, further comprising a message passing means, electrically joining said network I/O device to said data flow control means, for directing messages between said file server processing unit and said second processing unit.

15. A system as recited in claim 14, further comprising a client-readable medium of instructions for communicating with said data flow control means for making direct data transfer requests of selected data files so as to initiate transfer of the data files directly from said storage I/O device to said client.

16. A system as recited in claim 15, wherein said data flow control means comprises:

a first message control means for preventing client-originated control messages from being passed from said network I/O device to said message passing means;

data means for preventing data from being passed from said network I/O device to said interface means;

a second message control means for permitting client-originated control messages to be passed from said message passing means to said file server processing unit; and a third control message means for preventing control messages from being passed from said file server processing unit to said storage I/O device.

17. A data processing network, comprising:

a plurality of data processing units, independent of each other and each including a central processing unit (CPU), main memory, and input/output (I/O) units for processing application programs under the control of an operating system;

a remote server unit coupled to said data processing units via communication paths, including a server central processing unit (CPU), main memory, and input/output (I/O) units for processing information under the control of a server operating system;

said server unit further including:

storage means for storing program and data files for said data processing units; and means including said server CPU for transferring program and data files between said data processing units and said storage means via a direct transfer apparatus under the control of said server operating system in response to requests from said data processing units; and apparatus rendered effective by said server CPU in response to at least some of said requests for transferring said program and data files directly between the storage means and the data processing units via server network I/O devices under program control, bypassing said server planar board memory.

18. A data processing network, comprising:

a plurality of client data processing units, each including a central processing unit (CPU), main memory, and input/output (I/O) units for processing application programs under the control of an operating system;

a server unit coupled to said client data processing units via communication paths and including a server planar board CPU, a server planar board memory, and I/O units for processing information under the control of a network operating system;

said I/O units including a storage I/O device for storing program and data files for said client data processing units and a network I/O device coupling the server unit to the communication paths;

means including said server CPU for transferring said program and data files between said client data processing units and said storage I/O device via said communication paths, said network I/O device and said server planar board memory under the control of said server operating system in response to first requests from said data processing units; and program controlled apparatus rendered effective in response to other differing requests for transferring certain program and data files between said client data processing units and said storage I/O device via said communication paths and a direct path from the storage I/O device to the network I/O device by way of an I/O bus in the server unit, bypassing the server planar board memory.

19. The data processing network of claim 18, further comprising:

program controlled means in the network I/O device for
 (a) packetizing program and data files, received directly from the storage I/O device, in accordance with a predetermined protocol and
 (b) transmitting the packetized program and data files to the data processing units via said communications paths incident to said other requests.

20. Data processing apparatus comprising:

a central processing unit (CPU);

a main memory;

a plurality of input/output (I/O) units coupled to the CPU and memory by means including an I/O bus;

at least certain of the I/O units including bus master means coupled to the I/O bus and effective under program control for directly transferring data between the main memory and respective I/O units, independent of the CPU; and at least certain of the bus master means effective under program control for directly transferring data between a pair of said I/O units via said I/O bus, bypassing the main memory and independent of the CPU.

21. A computer program product for use with a data processing network including a plurality of client units for processing application programs and a server unit responsive to first requests from the client units for transferring program and data file information from a storage I/O device in the server unit to the client units by way of a server memory, a network I/O device in the server and network communication lines coupling the server unit to the client units, said computer program product comprising:

a computer useable medium having computer readable program code means embodied in said medium for causing the transfer of program and data file information directly from the storage I/O device to the network I/O device in response to predetermined other requests from the client units, said computer program product including:

computer readable first program code means for causing the server unit to read certain of said program and data file information from permanent storage media in the storage I/O unit to a first buffer in the storage I/O unit incident to one of said other requests from one of said client units;

computer readable second program code means for causing the server unit to transfer said certain program and data file information directly from the first buffer to a second buffer in the network I/O device via an I/O bus in the server.

22. The computer program product of claim 21, further comprising:

computer readable third program code means for causing a CPU in the network I/O device to format said certain information into data packets for transmission to said one client unit.

23. The computer program product of claim 22, further comprising:

computer readable fourth program code means for causing the network I/O device to transmit said data packets to said client units.

24. A method of transferring data file information from a storage input/output (I/O) device in a network file server unit to a client unit coupled to the server unit via a network communication path, said method comprising:

sending a predetermined request from the client unit to a network I/O device in the server unit for selected information in the storage I/O device;

examining said predetermined request in the server unit to distinguish it from other differing types of requests;

passing said predetermined request to a peer I/O transfer manager in the server unit;

under the control of said peer I/O transfer manager, effecting a data transfer of the selected information from the storage I/O device directly to the network I/O device via an I/O bus in the server unit; and processing said selected information in the network I/O device for transmission to the client unit via the network communication path.

25. A data processing network comprising:

a plurality of first and second client data processing units for processing application programs under the control of respective operating systems;

a server data processing unit including a server central processing unit (CPU), a server planar board memory, a storage input/output (I/O) device for storing program and data files for said client units, and a first and second network I/O devices coupled respectively to the first and second client data processing units via respective first and second network communication paths; said server unit effective under the control of a network operating system for transferring program and data file information from the storage I/O device to the client units; and program controlled means including bus master apparatus in at least one of the network I/O devices for transferring certain incoming data packets from a first client unit directly from the first network I/O devices to the second network I/O device via an I/O bus in the server unit for transmission to a second client unit, thereby bypassing the server planar board memory.

26. For use in a client/server network, a server processing unit comprising:

a central processing unit (CPU);

a main memory;

a plurality of input/output (I/O) units coupled to the CPU and memory by means including an I/O bus;

at least certain of the I/O units including bus master means coupled to the I/O bus and effective under program control for directly transferring data between the main memory and respective I/O units, independent of the CPU; and at least certain of the bus master means effective under program control for directly transferring data between a pair of said I/O units via said I/O bus, bypassing the main memory and independent of the CPU.

27. The server processing unit of claim 26, wherein said pair of I/O units includes a network I/O device and a storage I/O device.

28. The server processing unit of claim 26, wherein said pair of I/O units are a pair of network I/O devices.

29. An article of manufacture comprising:

a computer useable medium for use in a client/server network system having computer readable program code means embodied therein for causing a data packet received by a server over one network path to be forwarded to a client over a second network path, the compute readable program code means in said article of manufacture comprising:

computer readable first program code means for causing a first network I/O device to determine the destination address of a data packet received thereby over the one network path;

computer readable second program code means effective when the destination address is that of a client unit coupled to a second network I/O device via said second network path for causing a bus master mechanism in one of the network I/O devices to transfer the data packet directly from the first network I/O device to the second network I/O device via a server I/O bus, bypassing a server planar board memory; and computer readable third program code means for causing the second I/O device to transmit the data packet to the client unit via the second network path.

* * * * *